US010796808B2

(12) United States Patent
Noel

(10) Patent No.: US 10,796,808 B2
(45) Date of Patent: Oct. 6, 2020

(54) CONTAINMENT SEAL

(71) Applicant: NuScale Power, LLC, Corvallis, OR (US)

(72) Inventor: Derek Noel, Albany, OR (US)

(73) Assignee: NUSCALE POWER, LLC, Corvallis, OR (US)

(*) Notice: Subject to any disclaimer, the term of this patent is extended or adjusted under 35 U.S.C. 154(b) by 224 days.

(21) Appl. No.: 15/810,976

(22) Filed: Nov. 13, 2017

(65) Prior Publication Data

US 2018/0190397 A1 Jul. 5, 2018

Related U.S. Application Data

(60) Provisional application No. 62/441,020, filed on Dec. 30, 2016.

(51) Int. Cl.
*G21C 13/028* (2006.01)
*G21C 17/116* (2006.01)
(Continued)

(52) U.S. Cl.
CPC ............ *G21C 13/0285* (2013.01); *F16L 5/02* (2013.01); *G21C 13/036* (2013.01);
(Continued)

(58) Field of Classification Search
CPC .............. G21C 13/0285; G21C 13/036; G21C 13/0675; G21C 17/116; F16L 5/02; H02G 3/22
See application file for complete search history.

(56) References Cited

U.S. PATENT DOCUMENTS 3,828,118 A 8/1974 Bushek
4,507,521 A * 3/1985 Goellner ............... G01F 23/242
174/151
(Continued)

FOREIGN PATENT DOCUMENTS

DE 3335335 A1 3/1984
JP 2008163772 A * 7/2008

OTHER PUBLICATIONS

International Search Report and Written Opinion for International Application No. PCT/US2017/061356 dated Jan. 31, 2018.
(Continued)

*Primary Examiner* — Lily C Garner
(74) *Attorney, Agent, or Firm* — Perkins Coie LLP

(57) ABSTRACT

A containment seal seals a cable or tube to an opening accessing a containment vessel. The containment seal includes a lower body that attaches over the opening into the containment vessel. The cable or tube is inserted through a hole that extends axially through an upper body of the containment seal. Compression fittings are attached to the top and bottom ends of the upper body sealing the cable inside of the upper body. The cable sealed inside of the upper body in inserted through the lower body and into the opening accessing the containment vessel and a lower portion of the upper body is seated into the opening formed in the lower body. A retaining device compresses the upper body down against the lower body forming a seal between the upper body and lower body.

10 Claims, 10 Drawing Sheets

(51) Int. Cl.
   *G21C 13/036* (2006.01)
   *G21C 13/067* (2006.01)
   *F16L 5/02* (2006.01)
   *H02G 3/22* (2006.01)
(52) U.S. Cl.
   CPC ........ *G21C 13/0675* (2013.01); *G21C 17/116* (2013.01); *H02G 3/22* (2013.01); *Y02E 30/40* (2013.01)

(56) References Cited

U.S. PATENT DOCUMENTS

| | | | | |
|---|---|---|---|---|
| 4,723,795 | A | * | 2/1988 | Shenoy ...................... F16L 5/02 285/123.12 |
| 5,754,612 | A | * | 5/1998 | Gou .......................... G21C 1/08 376/295 |
| 10,388,417 | B2 | * | 8/2019 | Brown ............... G21C 13/0285 |
| 2016/0055932 | A1 | | 2/2016 | Leedecke |
| 2018/0030935 | A1 | * | 2/2018 | Clapham ................ F02M 26/65 |
| 2018/0190396 | A1 | * | 7/2018 | Brun .................... G21C 13/036 |

OTHER PUBLICATIONS

International Preliminary Report on Patentability for International Application No. PCT/US2017/061356, dated Jul. 11, 2019, pp. 9.

* cited by examiner

CONTAINMENT SEAL

This application claims priority to U.S. Provisional Patent Application No. 62/441,020, filed on Dec. 30, 2016 and entitled: VARIABLE POSITION MINERAL INSULATED (MI) CABLE OR TUBE CONTAINMENT SEAL WITH DOUBLE SEALS AND TEST POINTS, the contents of which are herein incorporated by reference in their entirety.

GOVERNMENT INTEREST

This invention was made with Government support under Contract No. DE-NE0000633 awarded by the Department of Energy. The Government has certain rights in this invention.

TECHNICAL FIELD

This disclosure generally relates to systems, devices, structures, and methods for sealing access devices in a containment vessel.

BACKGROUND

Industrial systems use electrical and mechanical instruments to monitor operating conditions within containment vessels. High integrity seals are used at the instrument-vessel access points. For example, nuclear reactors use high integrity seals at nuclear containment vessel access points to insert in-core instruments (ICIs) down into a nuclear reactor core.

The seals have many design challenges. For example, ICIs may have different insertion lengths to accommodate different guide tube routings to different instrument locations in the reactor core. Each different ICI cable length requires a customized seal fabrication along with maintaining an adequate ICI spare part inventory. The custom seal fabrications and associated spare parts increase the costs and complexity of the nuclear power plant.

Some nuclear power plants also may have an insufficient amount of space available inside of containment to house the sensors junction box. These space limitations pose additional problems when the ICI penetrate out of the nuclear containment vessel and require a complex double seal designs with interfaces for testing seal integrity.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

DETAILED DESCRIPTION

Figure 1:
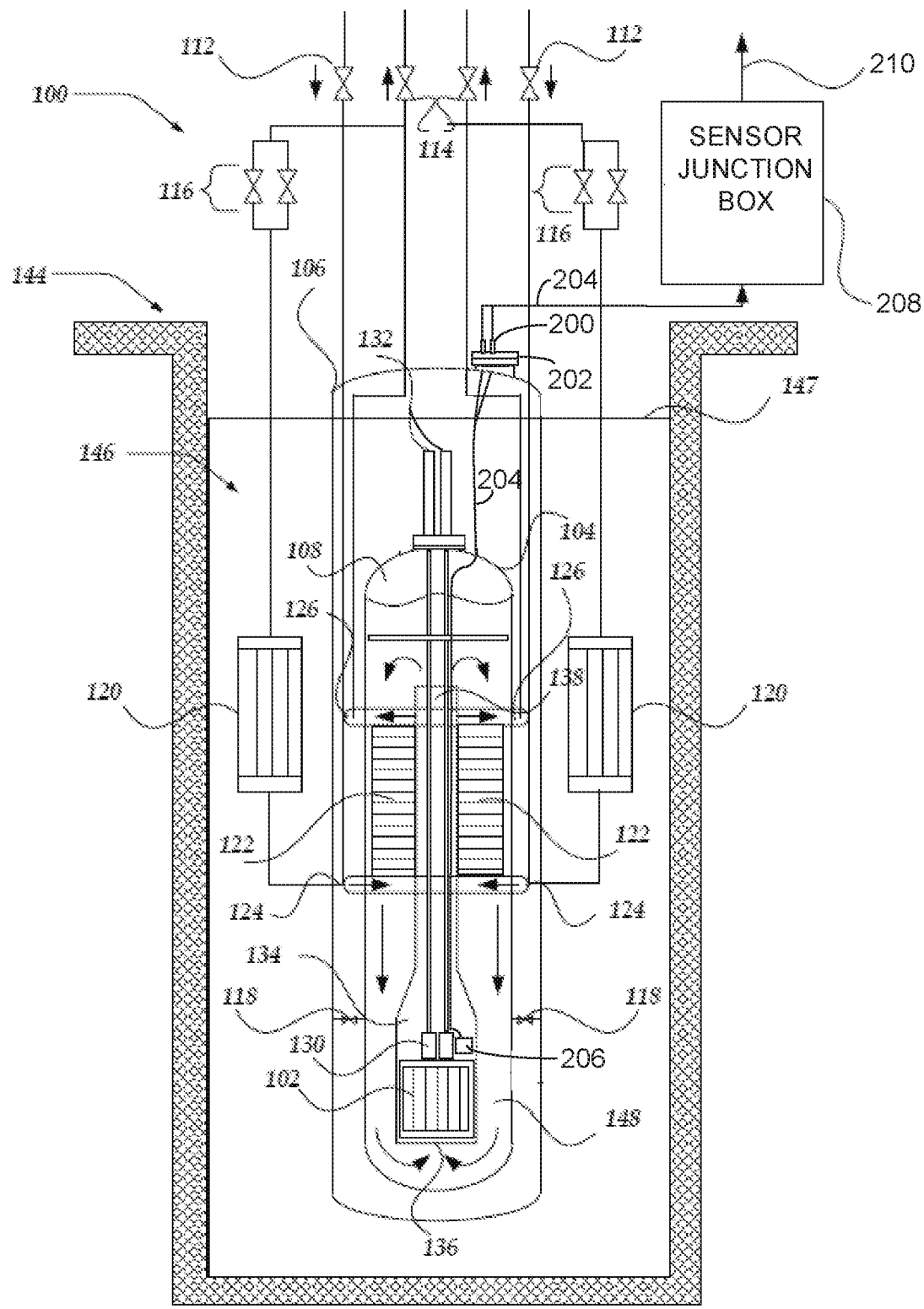
FIG. 1 shows a schematic diagram of an example power module.

A containment seal provides adjustable cable lengths and can be individually disassembled, withdrawn, and reassembled for nuclear refueling operations. An opening in the containment seal is large enough to receive variable sized cables, tubes and compression fittings. The containment seals can be attached in close proximity on a common flange to reduce space usage and simplify tool access on a nuclear containment vessel.

In one example, a nuclear reactor containment seal for sealing an opening into a containment vessel, comprises a lower body including an opening attaching over the opening into the containment vessel. A nut attaches to the lower body and an upper body includes a hole to receive and seal to a cable or tube. The upper body is configured to insert at least partially down into the opening in the lower body while the cable or tube extends through the upper body and the lower body into the containment vessel. The nut holds the upper body down against the upper body to form a sealed connection between the upper body and the lower body.

A bottom surface of the lower body may be welded to a cover for a flange attached to the containment vessel. The lower body may include a circular tube section including a bottom end attached over the opening into the containment vessel, and an upper arm may extend radially out from a top end of the circular tube section. The nut may include an upper tubular section that extends up around the arm of the lower body and around a portion of the upper body. A lower arm of the nut may extend radially inward from the upper tubular section and below the upper arm of the lower body. The nut also may include a threaded inside surface that threadingly engages with a threaded outside surface formed on the upper body.

The upper body may include a bottom tubular section that extends down through the opening into the lower body and into the containment vessel opening. A middle section of the upper body may extend up and radially out from the lower section forming a bottom surface that seats onto a top surface of the lower body.

The middle section may include a bottom threaded surface for threadingly engaging with a threaded inside surface of the nut, and a top multi-flat walled surface for engaging with a tool. The bottom surface of the middle section also may include one or more circular channels for retaining one or more O-rings that press against the top surface of the lower body.

A first test port may include a first channel that extends vertically from a top surface of the middle section down to the bottom surface of the middle section in between two of the O-rings. A second test port may include a second channel that extends horizontally from a side surface of the middle section to the hole that receives the cable or tube.

The upper body also may include a top tubular section having a smaller diameter than the middle section. The top and bottom tubular sections may receive compression fittings for sealing top and bottom ends of the upper body, respectively, to the cable or tube.

A method for sealing a cable or tube to the containment vessel may include attaching the lower body of the containment seal over the hole accessing the containment vessel. The cable or tube may be inserted through the hole that extends axially through the upper body of the containment seal. The compression fittings may be attached to the top and bottom ends of the upper body sealing the cable or tube inside of the upper body.

A portion of the upper body is inserted into the opening in the lower body so the cable sealed inside of the upper body extends through the hole accessing the containment vessel and down into the nuclear reactor core. The nut is then used to compress the upper body down against the lower body forming a seal between the upper body and lower body.

FIG. 1 is a schematic diagram of an example power module assembly 100. Power module assembly 100 may comprise an integral reactor pressure vessel (RPV) 104 and a containment vessel 106. In some examples, RPV 104 may be approximately 17.7 m (58 ft) tall and 3.0 m (10 ft) in diameter. The RPV 104 may contain a reactor core 102 having a number of fuel assemblies and control rods 130. In some examples, reactor core 102 may comprise approximately thirty-seven fuel assemblies and sixteen control rod clusters. Above reactor core 102 is a central hot riser tube 138, a pair of helical coil steam generators or heat exchangers 120 that at least partially surround the riser tube 138, and an internal pressurizer 108.

FIG. 1 also illustrates an example flow path for primary coolant 148. Primary coolant 148 may circulate upward through the reactor core 102, and the heated primary coolant 148 may be transported upward through the riser tube 130. The flow path of the primary coolant 148 may then be turned downward at a pressurizer plate that separates the main body of reactor vessel 104 from pressurizer 108. The primary coolant 148 may flow over the shell side of the heart exchangers 120, where it is cooled by conduction of heat to the secondary coolant contained within the heat exchangers 120. The primary coolant 148 may continue to flow downward until its direction is reversed at the lower head of the RPV 104 where the primary coolant 148 may be turned upward back into reactor core 102. The circulation of primary coolant 148 may be maintained entirely by natural buoyancy forces of the lower density (heated) coolant exiting the reactor core 102, and the higher density (cooled) coolant exiting the annulus of the heat exchangers 120.

On the secondary coolant side, feedwater may be pumped into the steam generator tubes where it boils to generate superheated steam. The steam may be circulated to a dedicated turbine-generator system. Low pressure steam exiting the turbine may be condensed and recirculated to the feedwater system. The entire nuclear steam supply system may be enclosed in a steel vessel, such as containment vessel 106, which in some examples may be approximately twenty three meters tall and approximately five meters in diameter.

In some examples, power module assembly 100 may include a modular nuclear reactor assembly including one or more fission reactors. Power module assembly 100 may be housed in a power module bay 144. The power module bay 144 may include a cooling pool 146 of water or some other material that includes thermal properties enabling the cooling of power module assembly 100. At least a portion of power module assembly 100 may be submerged in the cooling pool 146. Accordingly, at least a portion of the power module assembly 100 may be located below the top of a water line 147 of the cooling pool 146.

Additionally, power module assembly 100 may comprise a power module core 102. Power module core 102 may comprise any device, assembly, apparatus, or configuration that is employed to controllably generate heat. Thus, power module assembly 100 may comprise a heat generating assembly. In some examples, power module core 102 may comprise a nuclear reactor core, such as but not limited to a fission reactor core. Power module core 102 may be immersed in power module coolant 148. In at least one example, power module coolant 148 includes water or any other material that enables the flow of heat (generated by the power module core 102) away from the reactor core 102.

In some examples, power module assembly 100 may comprise a core shroud 134 that at least partially constrains, channels, or otherwise guides a flow of power module coolant 148. Power module core 102 may be at least partially surrounded by the core shroud 134. Power module core 102, core shroud 134, and power module coolant 148 are housed within a pressure vessel 104.

In various examples, power module core 102 may be configured to generate heat that is transferred to power module coolant 148. As shown by the flow arrows, heating power module coolant 148 in the pressure vessel 104 may generate a generally vertical circular convection current of the power module coolant 148. Core shroud 148 may be configured to at least partially constrain, channel, or otherwise guide the generally vertical circular convection current of the power module coolant 148. A pressurizer 108 may be configured to regulate the internal pressure within pressure vessel 104 that is due to at least the heating and/or the convection current of the power module coolant 148.

Power module core 102 may be configured to heat the portion of the power module coolant 148 that is in the lower plenum 136 of the core shroud 134. The heated power module coolant 148 flows upward and out of the shroud riser 138. As the power module coolant 148 flows upward, the heated power module coolant 148 provides heat to a plurality of steam generators 122. Due to at least this heat exchange, as the heated power module coolant 148 flows out of the shroud riser 138, the power module coolant 148 is cooled.

As shown by the flow arrows in FIG. 1, once outside of the shroud riser 138, the power module coolant 148 flows generally downward between the core shroud 134 and the pressure vessel 104. The convection current pulls the cooled power module coolant 148 near the lower plenum 136 back into the core shroud 134. Power module core 102 may be configured to reheat the power module coolant 148 such that the convection current continues to circulate and cool the reactor core 102.

Pressure vessel 104 may be housed within a containment vessel 106. Containment vessel 106 may prohibit the release of material out of the pressure vessel 104, including any material included in the reactor core 102, as well as the power module coolant 148. In some examples, power module assembly 100 may comprise a plurality of power module recirculation valves 118 to vent pressure within and/or dissipate excess heat away from the pressure vessel 104.

Feedwater may flow in a circuit that includes the steam generators 122 and electrical generators. Within the steam generators 122, the feedwater may be heated to generate stream. The generated steam flows out of the steam headers 126 and carries the transferred heat away from power module assembly 100. A plurality of steam isolation valves 114 may be configured to regulate the flow of the steam away from the power module assembly 100. The steam may be routed via a steam bus, such as but not limited to steam bus 160 of FIG. 2, to electrical generators, such as but not limited to turbine generator 176 of FIG. 2, to generate electrical power or some other form of usable power.

After the energy within the steam generates the electrical power, the return of the cooled feedwater to the power module assembly 100 may be regulated via a plurality of feedwater isolation valves 112. The cooled feedwater may be returned to the steam generators 122 via the feedwater headers 124, to complete the circuit.

In at least some examples, even after a shutdown of the power module assembly 100, the power module core 102 may be configured to continue generating heat. For instance, in examples where the reactor core 102 includes a nuclear reactor core, the nuclear reactor core may continue to generate heat during a decay period associated with the spent fuel within the nuclear reactor core. The heat that is generated after a shutdown of the power module assembly 100 may be decay heat. Accordingly, to ensure that the reactor core 102 and other components of the power module assembly 100 do not overheat, at least due to decay heat, the power generated by the reactor core 102 may be dissipated.

To dissipate decay heat in some examples, the power module assembly 100 includes a decay heat removal system (DHRS). The DHRS may include a plurality of DHRS heat exchangers 120 submerged in the cooling pool 146 of the power module bay 144, as well as a plurality of a plurality of DHRS valves 116 to divert the flow of the feedwater/steam away from the steam bus.

During a shutdown of the power module assembly 100, or during another event where it is desired to not provide the steam and/or heated feedwater to the electrical generators, the plurality of steam isolation valves 114 may be closed such that the steam and/or heated feedwater does not flow to the electrical generators. Rather, the steam and/or heated feedwater flows through the plurality of DHRS heat exchangers 120 and is cooled. The DHRS heat exchangers 120 dump the excess heat into cooling pool 146. The circular flow of feedwater through the decay heat exchangers 120 may be regulated by the plurality of DHRS valves 116.

The rate of power generation of the of the reactor core 102 may be regulated by the positioning of one or more control rods 130. The positioning of the one or more control rods 130 may be driven by control rod drives 132.

Containment Seal

Power module assembly 100 may use a plurality of diagnostic sensors 206. Diagnostic sensors 206 may sense and/or generate sensor data to monitor various components and conditions of power module 100. Sensors 200 may include any other type of instrument that provides any type of reading or measurement.

For example, sensors 206, may include but are not limited to temperature sensors, pressure sensors, valve configuration sensors, control rod positioning sensors, radioactivity fission sensors, fluid and gas flow sensors, safety sensors or safety-related sensors, asset protection-related sensors, or any other sensor, that monitors conditions in power module assembly 100.

Sensors 206 may be located anywhere within power module 100, such as in reactor pressure vessel 104 and/or containment vessel 106. In the example described below as least some of sensors 206 are located in and/or next to nuclear reactor core 102.

In one example, cables or tubes 204 connect at a first end to sensors 204 and extend up through reactor pressure vessel 104 and core shroud 134 along control rod drives 132.

Second ends of cables 204 may extend up through a top head of reactor vessel 104 and through a flange 202 located on the head of containment vessel 106. Second ends of cables 204 connect to a sensor junction box 208 located outside of containment vessel 106. Junction box 208 may transmit and receive sensor signals on cables 204 and on a sensor data bus 210.

In one example, one or more containment seals 200 securely attach cables 204 to flange 202. As briefly described above, containment seals 200 may attach to various selectable locations on cable 204. This allows the same generic type of containment seal 200 to attach to a variety of different in-core instrument cable lengths without having to weld or prefabricate custom seals to each different length of cable 204.

Figure 2:
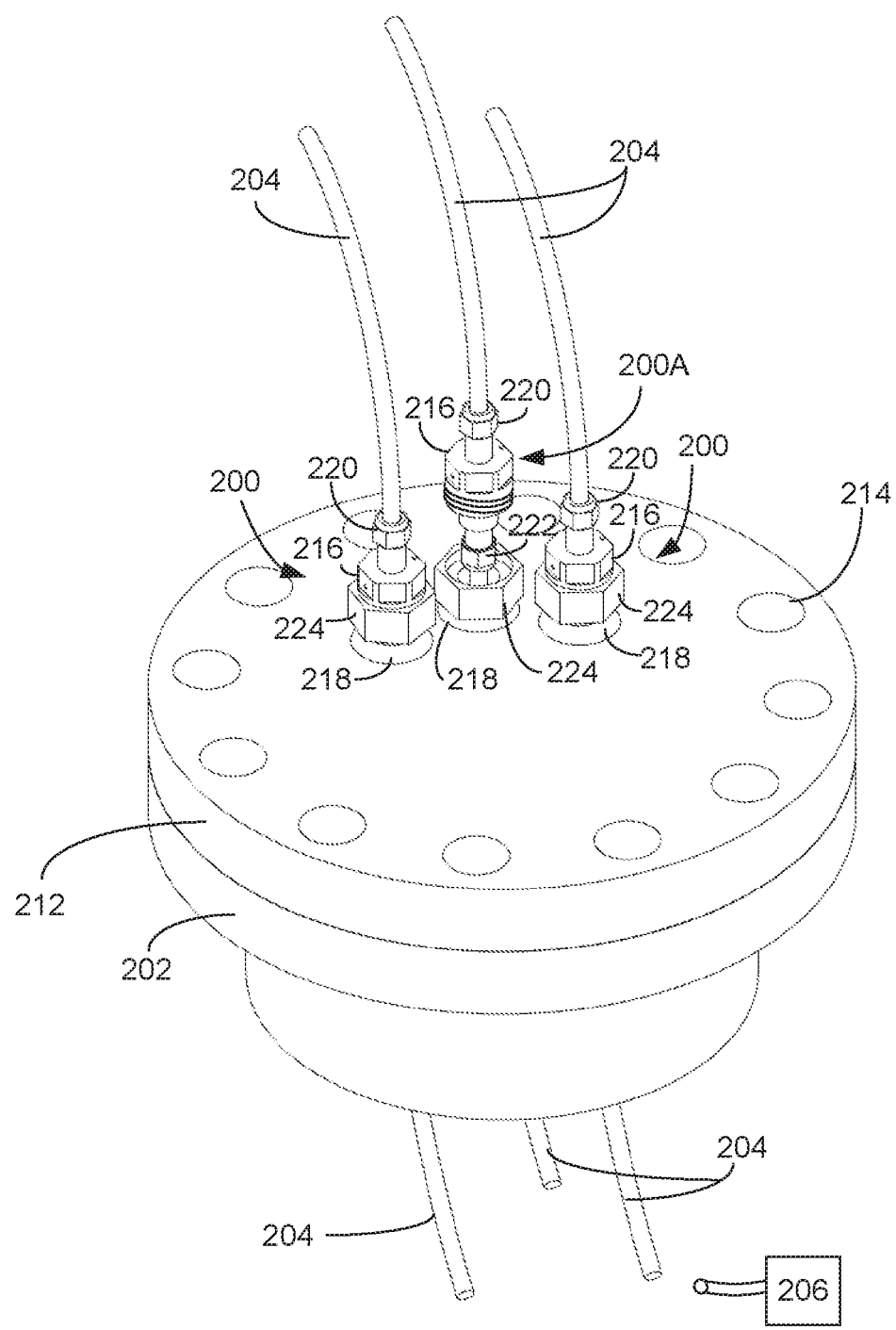
FIG. 2 is a perspective view of containment seals attached to a flange.
Figure 3:
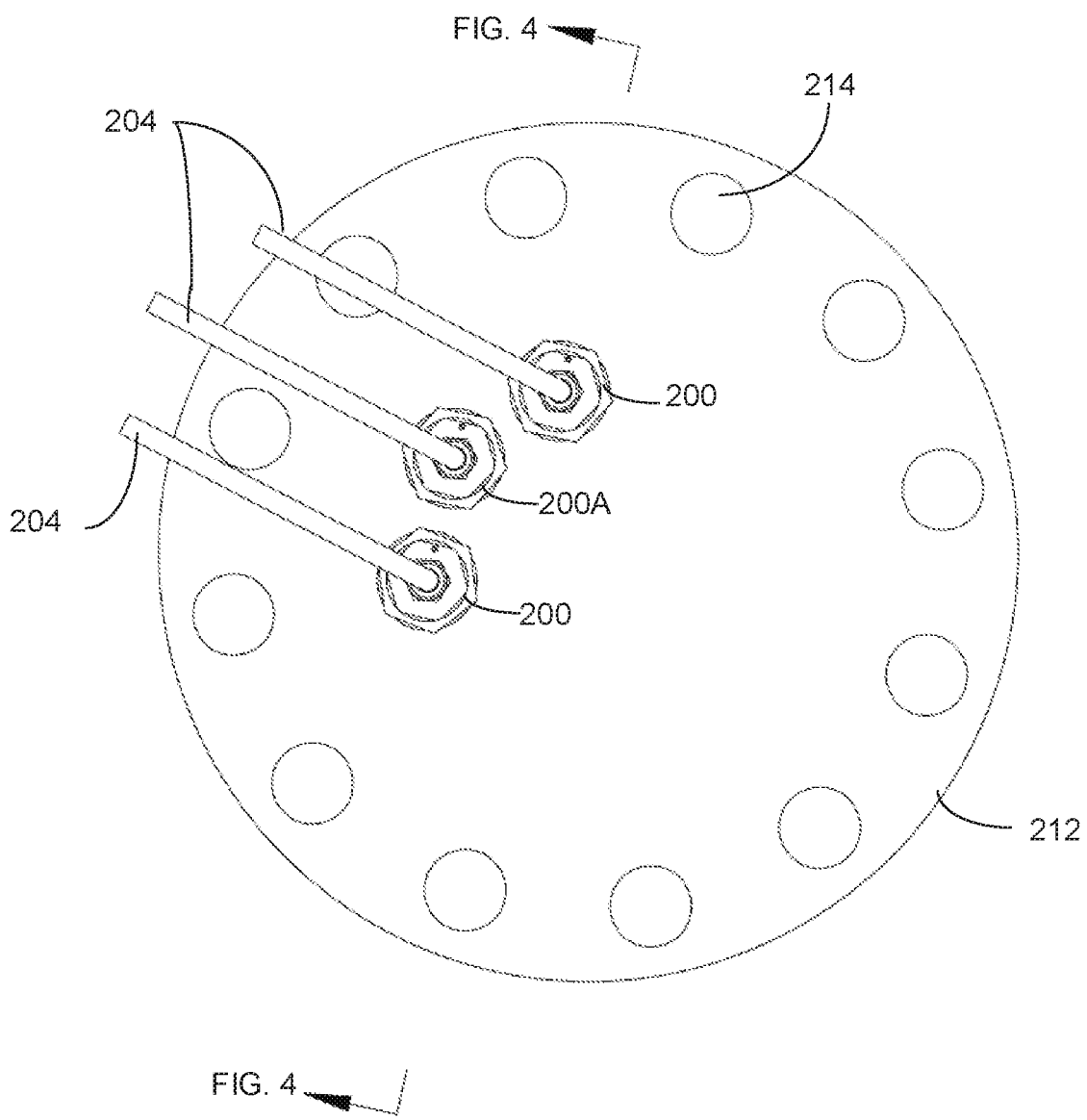
FIG. 3 is a top view of the containment seals shown in FIG. 2.

FIG. 2 is a top perspective view of multiple containment seals 200 attached to the top of flange 202 and FIG. 3 is a top view of containment seals 200 attached to the top of flange 202. Referring to FIGS. 1-3, multiple different containment seals 200 may insert into holes formed in a top cover 212 of flange 202. As shown above, Flange 202 may be metal, such as stainless steel, that is welded around an opening formed in the top head of containment vessel 106. Flange 202 is used for inserting cables 204 and attached sensors 206 down into containment vessel 106.

In one example, cover 212 may include holes 214 that align with holes formed in flange 202. Bolts (not shown) are inserted into holes 214 sealing cover 212 over the central opening 226 in flange 202. A middle one of containment seals 200A is shown in a detached state where an upper body 216 is detached from a lower body 218 that is welded onto cover 212.

Containment seals 200 on the opposite sides of containment seal 200A are shown in fully attached states where upper bodies 216 are inserted and held in compression against associated lower bodies 218 by union type nuts 224. Upper and lower bodies 216 and 218, respectively, are alternatively referred to as upper and lower members, assemblies, portions, or any other type of apparatus.

Upper and lower compression fittings 220 and 222 seal upper and lower ends of containment seals 200, respectively, to cables 204. Threads on the inside surface of nut 224 then threadingly engage with threads formed on the outside surface of upper body 216. Nut 224 is rotated compressing and sealing upper body 216 down against a top surface of lower body 218.

To remove sensor 206 and cable 204 from the containment vessel, nut 224 is unscrewed releasing upper body 216 from lower body 218. Upper body 216 is pulled upwards out of lower body 218 pulling cable 204 and sensor 206 up through reactor pressure vessel 104, containment vessel 106, flange 202, and out the hole formed in cover 212.

Containment seals 200 can be used for sealing cables, conduits, tubes, or any other type of access device to any type of containment structure. The relatively slender profile allow multiple different seals 200 to be attached around the top of a relatively small diameter flange 202. Compression fittings 220 and 222 allow containment seals 200 to be attached at different selectable and re-attachable positions on cable 204 so variable length in-core instruments 206 can be inserted into different locations within reactor core 102.

Figure 4:
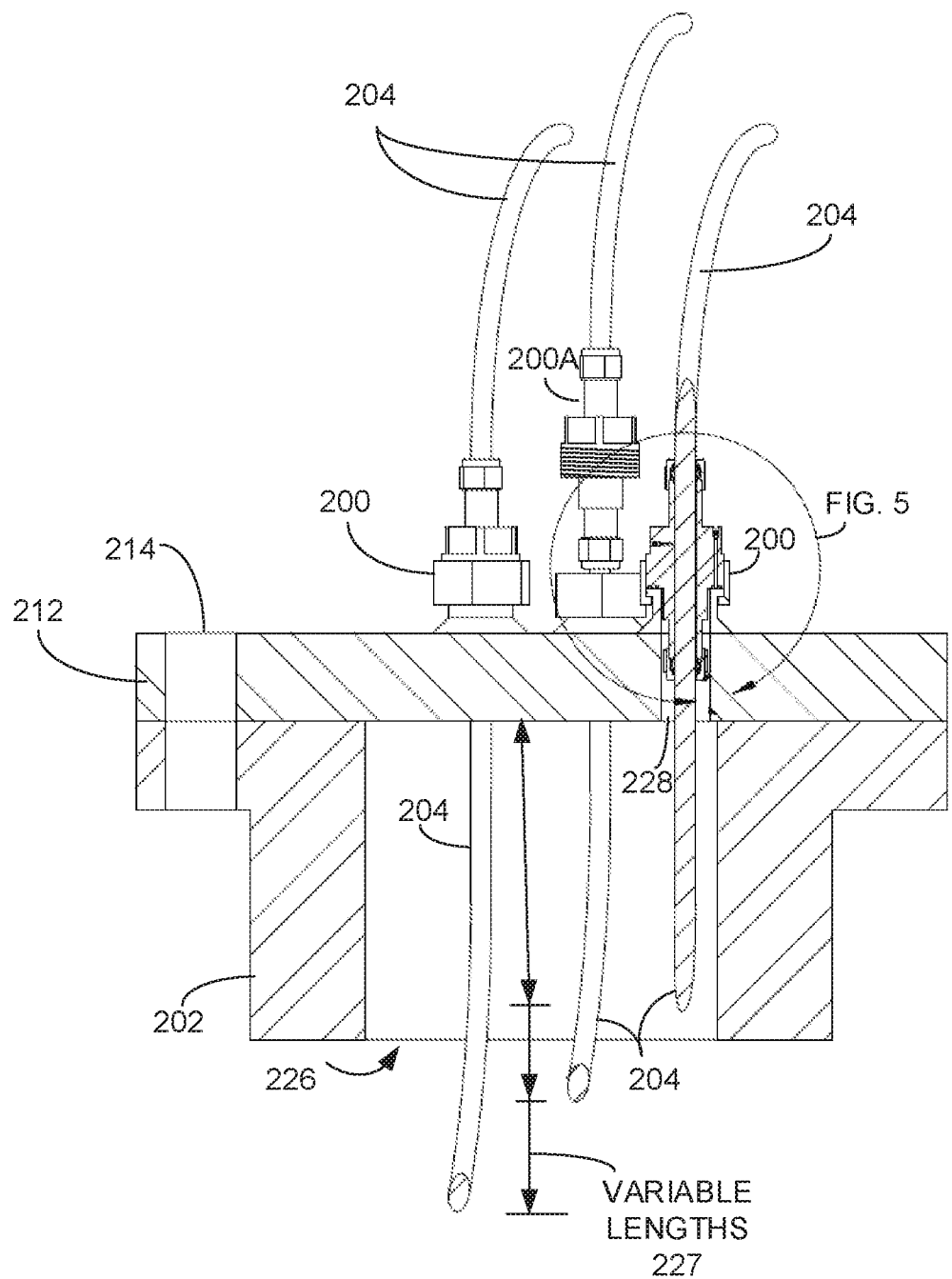
FIG. 4 is a side section view of the containment seals shown in FIGS. 2 and 3.
Figure 5:
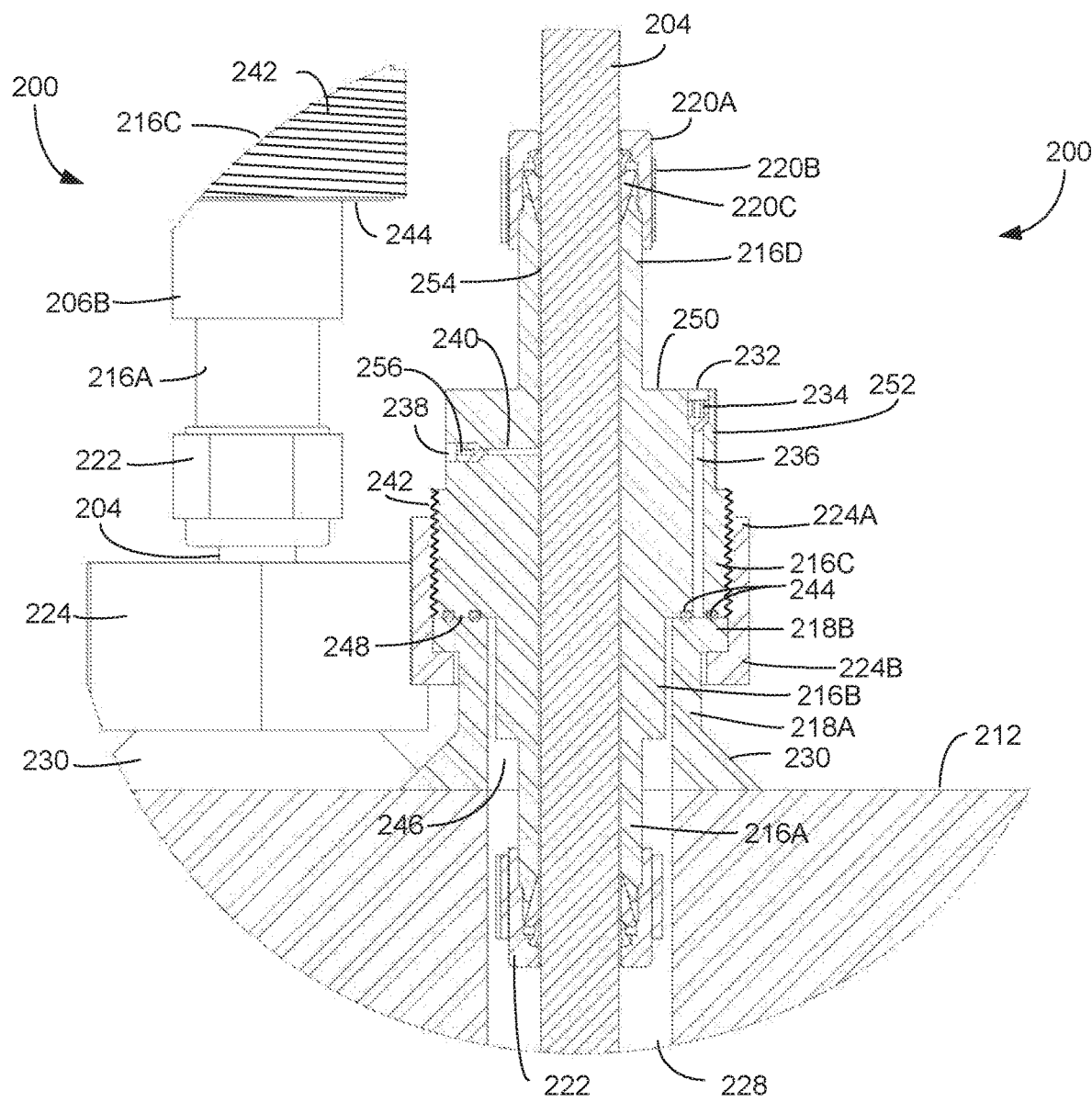
FIG. 5 is an enlarged side sectional view of a containment seal.
Figure 7:
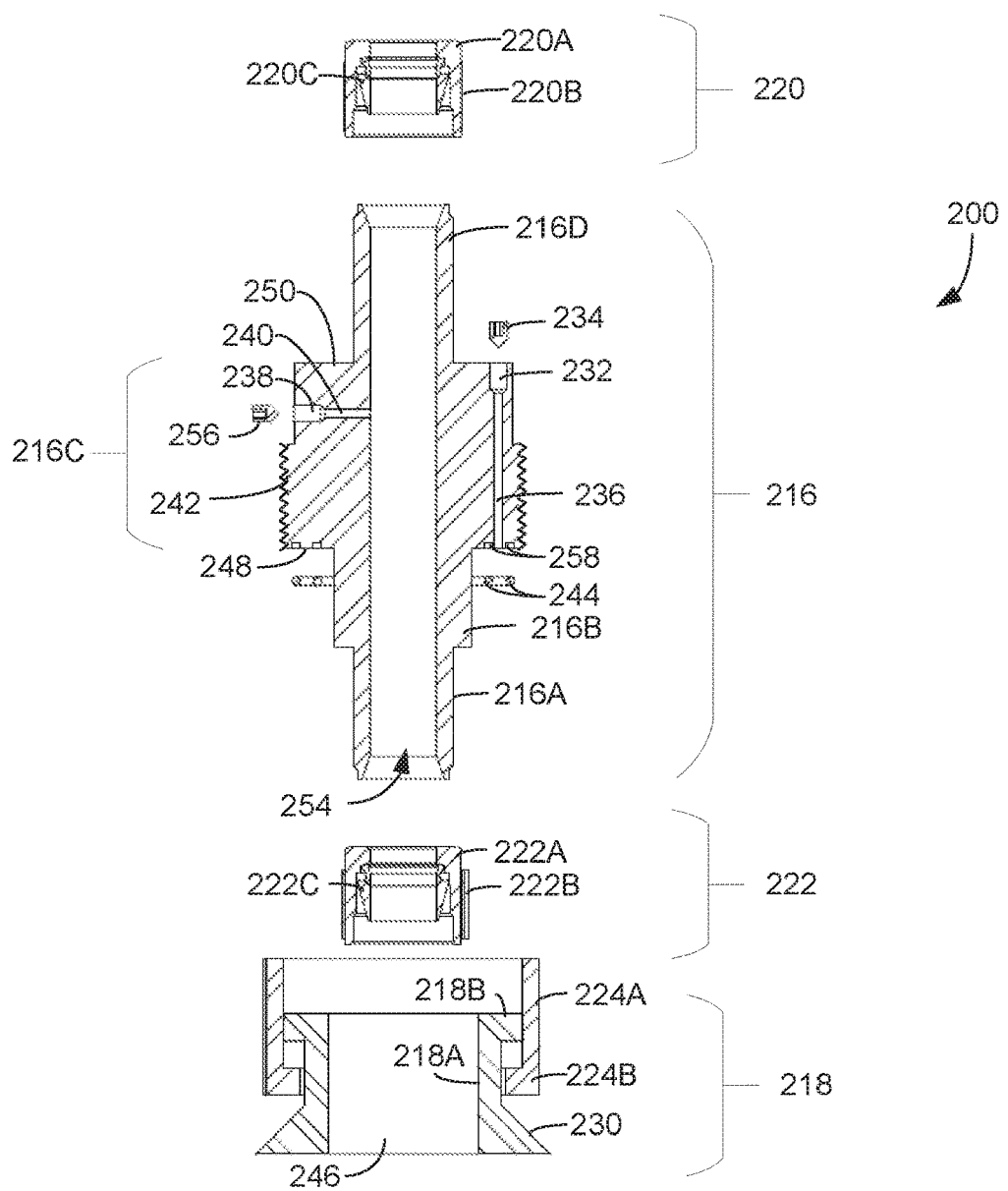
FIG. 7 is an exploded side sectional view of the containment seal.
Figure 6:
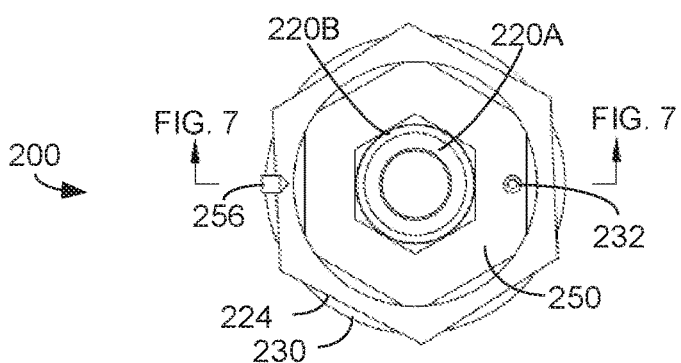
FIG. 6 is a top view of the containment seal.

FIG. 4 is a side sectional view of one of containment seals 200 attached to flange 202, FIG. 5 is a more detailed side sectional view of containment seal 200 attached to flange 202, FIG. 6 is a top isolated view of containment seal 200, and FIG. 7 is an exploded isolated side sectional view of containment seal 200.

Referring to FIGS. 4-7, containment seals 200 each include a lower body or assembly 218 attached at a bottom end to flange cover 212 with a weld joint 230. Lower body 218 includes a circular tube section 218A that extends up from cover 212. Tube section 218A includes a central hole or opening 246 concentrically aligned with hole 228 that extends through flange cover 212. An arm or lip 218B extends radially out from the top of tube section 218A.

Union type nut 224 includes a circular tube section 224A with an arm or lip 224B that extends radially inward to engage with lower body arm 218B. Nut 224 may have flat outside walls or surfaces forming a square or hexagonal cross-sectional shape for engaging with a wrench or other tool. Nut 224 also may include a threaded inside surface for threadingly engaging with a threaded outside surface 242 formed on upper body 216.

Upper body 216 may include a first lower tube section 216A that extends downward through lower body 218 and into hole 228 formed in flange cover 212. A second section 216B of upper body 216 may have a larger diameter than first tube section 216A and fit more snugly into hole 246 of lower body 218. A middle section 216C of upper body 216 may extend up from section 216B and a fourth upper tube section 216D may extend up from above middle section 216C.

Middle section 216C may include a top end 250, bottom end 248, a lower threaded side surface 242, and an upper flat sided surface 251. A diameter change between section 216B and middle section 218C may form bottom surface or shelf 248 that extends out over upper body sections 216A and 216B.

Lower threaded side surface 242 engages with the threaded inside surface of nut 224. Upper multiple flat walled side surface 252 may form a square or hexagonal cross-sectional shape for engaging with a wrench or other tool.

A hole or channel 254 may extend vertically, longitudinally, and/or axially through the center of upper body 216 and is sized to snugly receive cable 204. It should be understood that while a relatively flexible cable 204 is shown, containment seal 200 may attach and seal any type of access device including flexible or rigid tubes, conduits, hoses, wires, or the like, or any combination thereof that may infiltrate any type of structure. Hole 254 may have other sizes or shapes to accommodate the different types of access devices used for inserting into containment vessel 106.

Diameters of lower tube section 216A and upper tube section 216D are sized to receive and attach to compression fittings 222 and 220, respectively. In one example, compression fittings 222 and 220 are Swagelok® type seals made by Swagelok Company, 6262 Cochran Road, Solon, Ohio 44139. However, any other type of compression fitting could also be used.

Compression fitting 222 may include a receiving body or fitting 222A with a threaded outside surface that receives a compression nut 222B with a threaded inside surface. One or more inner compression rings or ferrules 222C are located inside body 222A. Compression fitting 220 may include a receiving body or fitting 220A with a threaded outside surface that receives a compression nut 220B with a threaded inside surface. One or more inner compression rings or ferrules 220C are located inside body 220A.

Using compression fitting 220 as an example, after cable 204 is inserted into upper body 216, compression fitting 220 is slide over cable 204 and attached over the top end of upper tube section 216D. Nut 220C is tightened compressing ferrules 220C between fitting 220A and the top end of upper tube section 216D. The ends of ferrules 220C clamp around cable 204 and seal the space between cable 204 and receiving fitting 220A forming a tight joint. Ferrules 222C in compression fitting 222 operate similar to ferrules 220C in compression fitting 220. Compression fittings are known by those skilled in the art and therefore not described in further detail.

Compression fittings 222 and 220 seal the bottom and top ends, respectively, of upper body 216 to selectable locations on cable 204. Compression fittings 222 and 220 can also be detached and the same or different fittings reattached to cable 204 and the opposite ends of upper body 216. Thus, sealing cable 204 to upper body 216 is simpler than welding cable 204 to a custom mounting plate.

Two O-rings 244 may be located in circular channels 258 formed on bottom side 248 of middle section 216C. O-rings 244 may be made from an elastically compressible material, such as metal, rubber or plastic.

Bottom tubular section 216A is inserted through nut 224 and lower body 218 and into hole 228 formed in flange cover 212 as described above. O-rings 244 extend downward from bottom end 248 and sit against a top surface of lower body arm 218B. Initially, nut 224 may hang down against lower body 218 as shown in FIG. 7.

Nut 224 is then screwed upward onto outside threaded surface 242 of middle section 216C. As nut 224 continues to screw upwards on threads 242, lower arm 224B of nut 224 starts moving upwards pressing up against lower body arm 218B.

Additional upward screwing of nut 224 starts pulling upper body 216 downward compressing O-rings 244 against the top surface of lower body arm 218B. At this point O-rings 244 form an airtight and watertight seal between upper body 216 and lower body 218. The sealing of upper body 216 with lower body 218, along with the previous sealing of cable 204 to upper body 216 with compression fittings 220 and 222, forms a complete seal of cable 204 to flange cover 212.

Other types of retaining devices may be used instead of nut 224. For example, a bolted flange, latch, clamp, catch etc. may include hooks that rotationally attach to lower body 218 and clamp and pull down on keepers or strikes that extend out from the sides of upper body 216. In another example, the nut or latch may rotationally attach to upper body 216 and screw or latch onto lower body 218.

Containment seal 200 may include two test ports 232 and 238. Test port 238 may include a channel 240 that extends horizontally and laterally through upper body middle section 216C. A first end of channel 240 may receive a plug 256 and the second end of channel 240 may extend into hole 254.

Test port 238 may be used for testing the seal between cable 204 and upper body 216. For example, plug 256 may be removed and pressured air inserted into test port 238. If a proper seal exists, the pressured air will not escape out the top or bottom ends of upper body 216 between hole 254 and cable 204. The seal between upper body 216 and cable 204 may be tested as described above prior to or after inserting and sealing upper body 216 into lower body 218.

Test port 232 may include a channel 236 that extends vertically, longitudinally, and/or axially through middle section 216C of upper body 216 from top end 250 to bottom end 248. The top of channel 236 may receive a plug 234 and the bottom of channel 236 may extend out in-between O-rings 244.

The seal between lower body 218 and upper body 216 can be tested by removing plug 234 and inserting pressurized air into test port 232. If the seal is airtight, no air escapes from channel 236 into hole 228 of flange cover 212.

Figure 8:
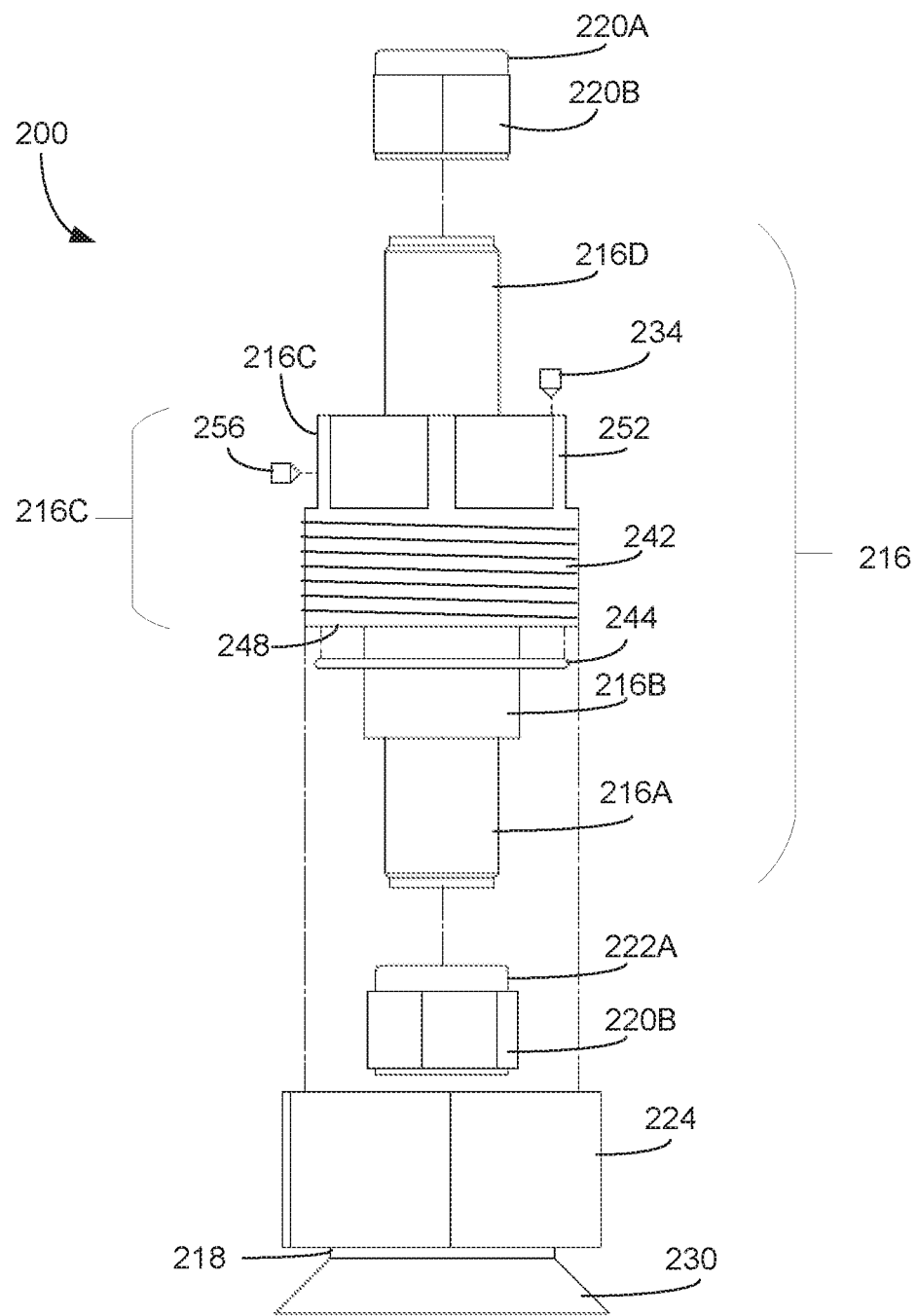
FIG. 8 is an exploded side view of the containment seal.
Figure 9:
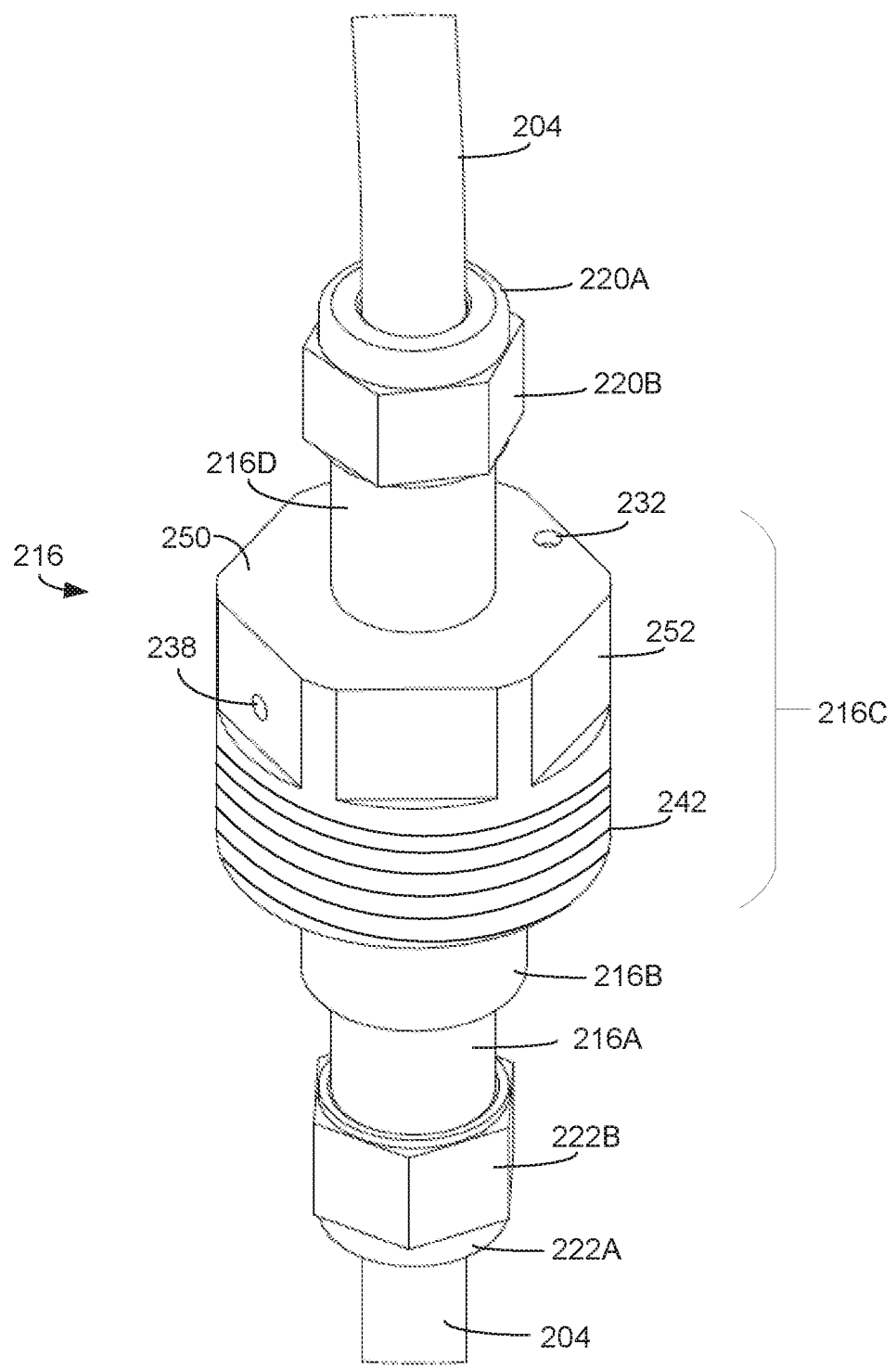
FIG. 9 is a top perspective view showing an upper body of the containment seal.
Figure 10:
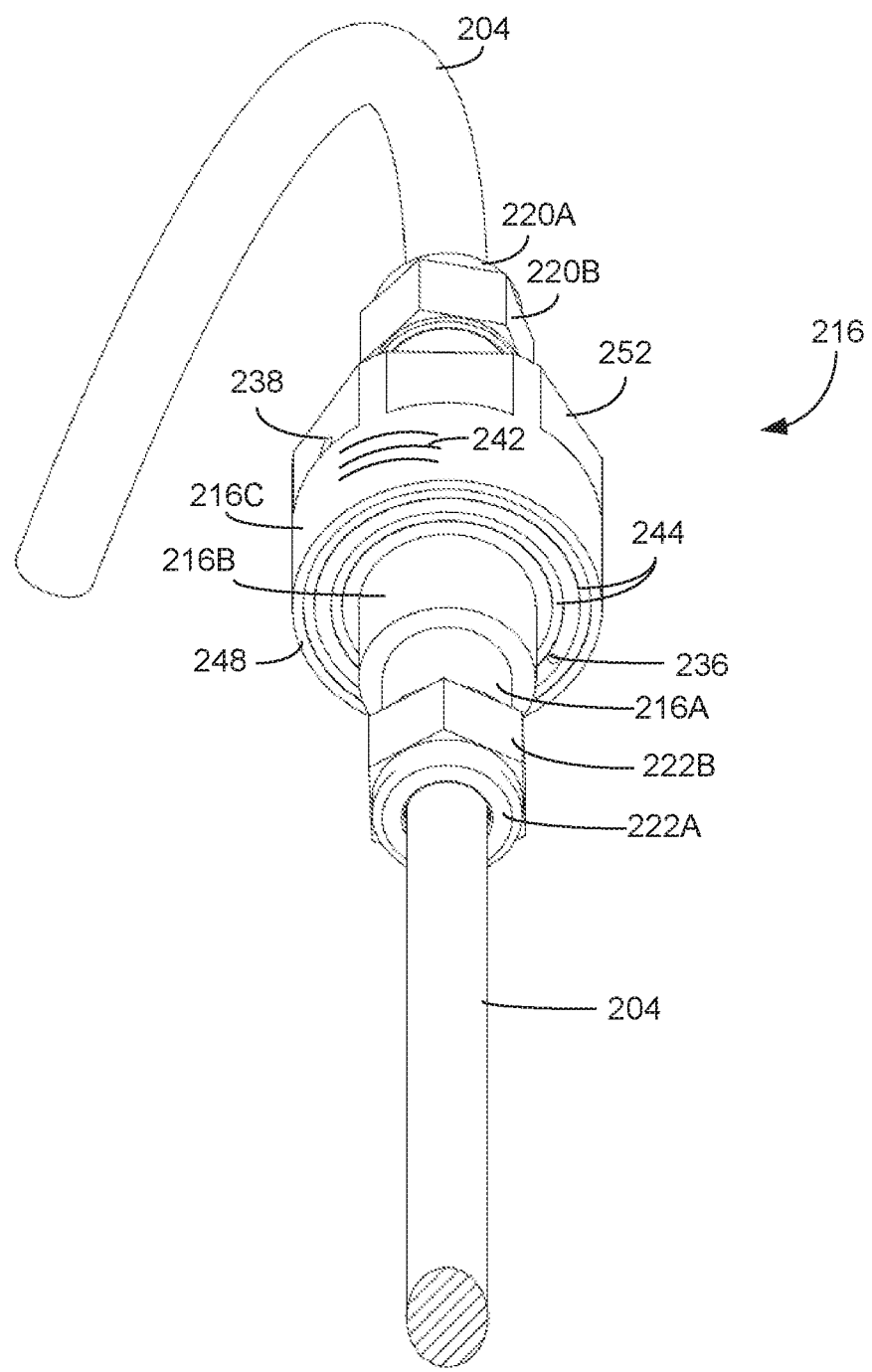
FIG. 10 is a bottom perspective view showing the upper body of the containment seal.

FIG. 8 shows an exploded isolated side view of containment seal 200 without cable 204, FIG. 9 is a top perspective view of containment seal upper body 216, and FIG. 10 is a bottom perspective view of upper body 216. In FIG. 10, threads 242 are only partially shown to more clearly bottom side 248 of middle section 216C.

Referring to FIGS. 7-10, as explained above, nut 224 is attached to lower body 218 and a weld 230 attaches lower body 218 to cover 212 of containment vessel flange 202 (FIG. 2). Upper body 216 can attach to any position on cable 204 simply by sliding cable 204 through upper body 216 to a desired location.

A technician may determine the required length of cable 204 to insert into the containment vessel. Cable 204 is inserted into hole 254 that extends through upper body 216. Lower compression fitting 222 is slid over cable 204 to seal the bottom end of upper body 216 to cable 204 to provide the desired cable length. Upper compression fitting 220 is slid over cable 204 to seal the top end of upper body 216 to cable 204.

Plug 256 is removed and high pressure test equipment attached to test port 238. Test port 238 is easily accessible from side surface 252 of upper body 216. If no air escapes from test port 238, cable 204 is correctly sealed to upper body 216.

Upper body 216 is inserted down into lower body 218 and nut 224 screwed onto threads 242 formed on the outside of middle section 216C. Redundant O-rings 244 were previously inserted into two circular channels 258 formed on the bottom side of middle upper body section 216C. O-rings 244 compress against the top surface of lower body 216 sealing upper body 216 with lower body 218.

Upper body middle section 216 may have an outside surface 252 with a male square or hexagonal cross-sectional shape to interface with a tool such as a wrench. The outside surface 252 may have a hexagonal cross-sectional shape to interface with a tool such as a wrench.

Plug 234 is removed and the high pressure test equipment attached to test port 232. Test port 232 is easily accessible from the top end 250 of upper body 216. If no air escapes from test port 232, O-rings 244 have properly sealed upper body 216 to lower body 218.

Figure 11A:
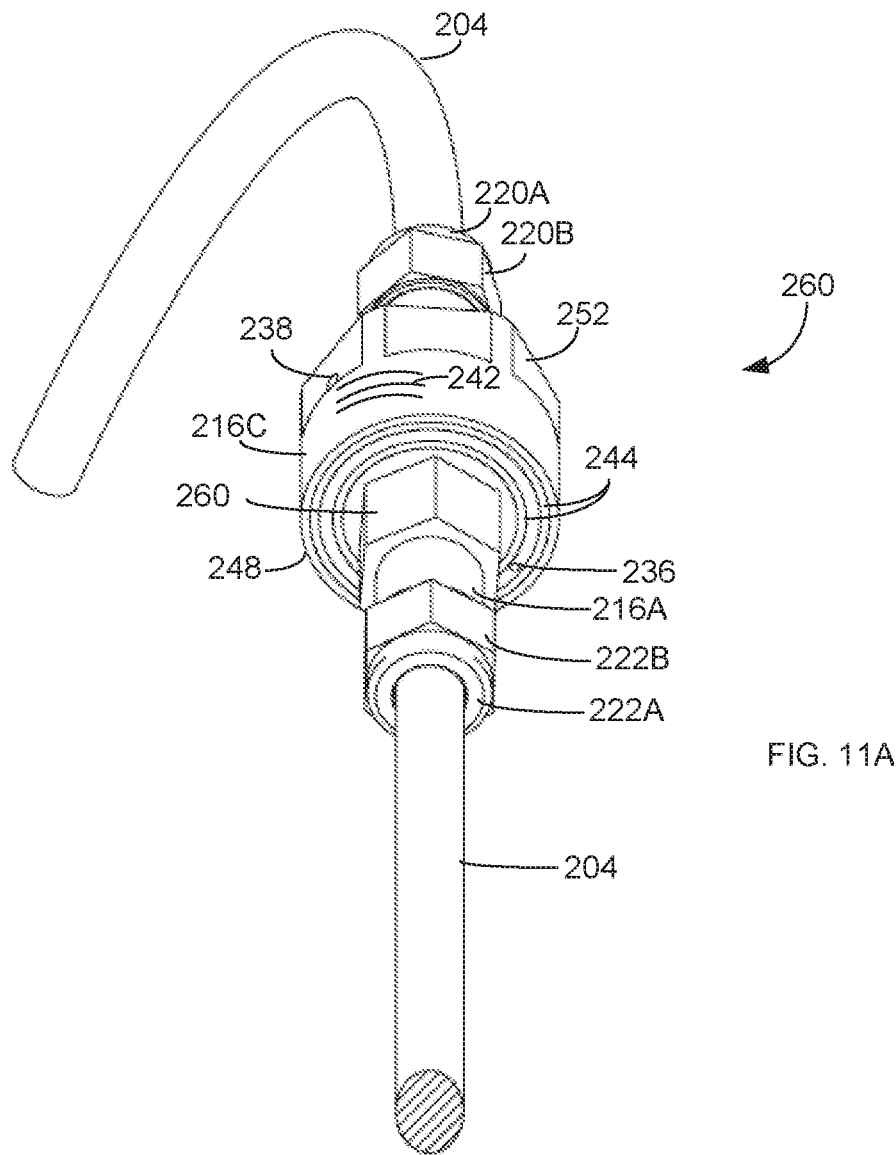
FIG. 11A shows an isolated lower perspective view of an alternative upper body.
Figure 11B:
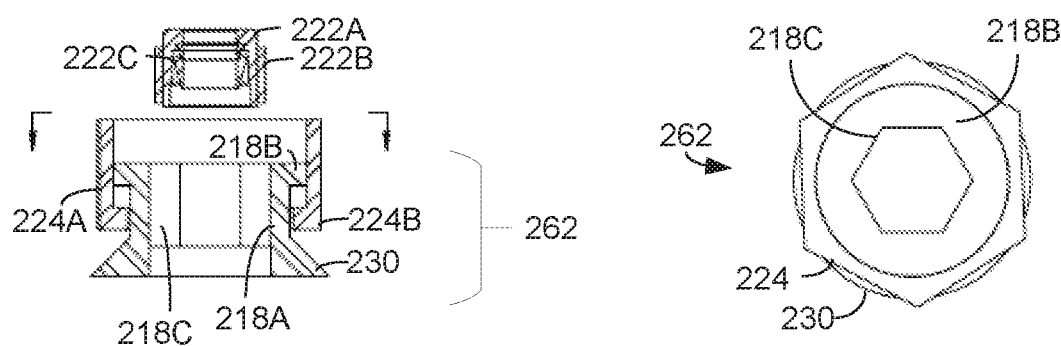
FIG. 11B shows a side section view of an alternative lower body.
Figure 11C:
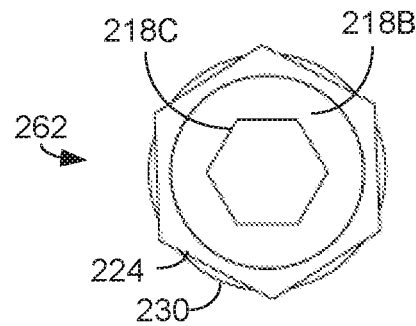
FIG. 11C shows a top view of the alternative lower body.

FIG. 11A shows an isolated lower perspective view of an alternative upper body 260, FIG. 11B shows a side sectional view of an alternative lower body 262, and FIG. 11C shows a top view of lower body 262.

Referring to FIGS. 11A-11C, upper body 260 and lower body 262 include similar elements and operate similarly to upper body 216 and lower body 218 described above. However, lower body 262 includes an inner wall 218C forming a square or hexagonal cross-sectional shape and upper body 260 includes an intermediate section 260 with an outside surface forming a square or hexagonal cross-sectional shape.

Intermediate section 260 inserts into inside wall 218C. The two square or hexagonal shaped sections 218C and 260 align together and prevent O-ring seals 244 from spinning allowing union type nut 224 to tighten upper body 216 to lower body 218 with a single wrench.

Referring to all of the Figures described above, containment seal 200 allows insertion of in-core instruments 206 into reactor core 102 through reactor pressure vessel 104 and containment vessel 106. Instruments 206 can pass through hole 246 formed in lower body 218 and co-centrically aligned hole 228 formed in flange cover 212. This resolves containment vessel space restrictions within the containment space between reactor pressure vessel 104 and containment vessel 106.

This also resolves space restrictions that may limit the size of flange 202. For example, some containment vessels 106 may be relatively narrow, such as around five meters in diameter. The relatively narrow profiles of containment seals 200 allow multiple in-core instruments 206 to insert through a same relatively small flange 202.

Containment seals 200 can attach to continuous cables 204 that extend from the top of containment vessel 106 down to reactor core 102. This allows more accurate readings of weak sensor signals that may not carry well over multi-connection signal channels.

Compression seals 220 and 222 can attach to any cable location. Upper body 218 is attachable and detachable from lower body 260. Therefore, cables 204 no longer need to be permanently welded to flange 202 and multiple custom welded cable connections are not needed as backups for each in-core instrument. Instead, the same type containment seal 200 can be used to custom fit instruments 206 to multiple different locations within reactor core 102.

Having described and illustrated the principles of a preferred embodiment, it should be apparent that the embodiments may be modified in arrangement and detail without departing from such principles. Claim is made to all modifications and variation coming within the spirit and scope of the following claims.

Some of the operations described above may be implemented in software and other operations may be implemented in hardware. One or more of the operations, processes, or methods described herein may be performed by an apparatus, device, or system similar to those as described herein and with reference to the illustrated figures.

It will be apparent to one skilled in the art that the disclosed implementations may be practiced without some or all of the specific details provided. In other instances, certain process or methods also referred to herein as "blocks," have not been described in detail in order to avoid unnecessarily obscuring the disclosed implementations. Other implementations and applications also are possible, and as such, the following examples should not be taken as definitive or limiting either in scope or setting.

References have been made to accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described are not necessarily performed in the order indicated in some other implementations.

Additionally, in other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B or C" is intended to include the possibilities of "A," "B," "C," "A and B," "B and C," "A and C" and "A, B and C."

Having described and illustrated the principles of a preferred embodiment, it should be apparent that the embodiments may be modified in arrangement and detail without departing from such principles. Claim is made to all modifications and variation coming within the spirit and scope of the following claims.

The invention claimed is:

1. A nuclear reactor containment seal for use sealing an opening of a containment vessel, comprising:
   a lower body having an opening positionable to align with the opening of the containment vessel;
   an upper body including a through-hole, with the through-hole of the upper body and the opening of the lower body configured to receive a cable or tube to extend therethrough, the upper body having a bottom tubular section configured to insert at least partially down into the opening in the lower body, and a middle section that extends up and radially out from the bottom section and forms a bottom surface that seats onto a top surface of the lower body, the middle section having a threaded side surface; and
   a nut retained by the lower body and configured to threadably engage the threaded side surface of the upper body to hold the upper body down against the lower body, forming a sealed connection between the upper body and the lower body.

2. The containment seal of claim 1, wherein a bottom surface of the lower body is attached to a cover for a flange attached to the containment vessel.

3. The containment seal of claim 1, wherein the lower body includes:
   a circular tube section including a bottom end attached over the opening into the containment vessel; and
   an upper arm that extends radially out from a top end of the circular tube section.

4. The containment seal of claim 3, wherein the nut comprises:
   an upper tubular section that extends up around the arm of the lower body and around a portion of the upper body; and
   a lower arm that extends radially inward from the upper tubular section below the upper arm of the lower body.

5. The containment seal of claim 1, wherein the middle section includes:
   a multi-flat walled side surface for engaging with a tool.

6. The containment seal of claim 1, wherein the bottom surface of the middle section includes one or more circular channels for retaining one or more O-rings that press against the top surface of the lower body.

7. The containment seal of claim 6, including:
   a first test port including a first channel that extends from an exterior of the upper or lower body into an interior of the upper or lower body between two of the O-rings; and
   a second test port including a second channel that extends from the exterior of the upper or lower body into the hole that receives the cable or tube.

8. The containment seal of claim 1, wherein the upper body includes:
   a top tubular section having a smaller diameter than the middle section and extending up from a top end of the middle section configured to receive a compression fitting and seal a top end of the upper body to the cable or tube; and
   wherein the bottom tubular section has a smaller diameter than the middle section and extends down from a bottom end of the middle section to receive a compression fitting and seal a bottom end of the upper body to the cable or tube.

9. A nuclear reactor containment seal for use sealing an opening of a containment vessel, comprising:
   a lower body including an opening attaching over the opening into the containment vessel;
   an upper body including a through-hole, with the through-hole of the upper body and the opening of the lower body configured to receive a cable or tube to extend therethrough, the upper body having a bottom tubular section configured to insert at least partially down into the opening in the lower body, and a middle section that extends up and radially out from the bottom section and forms a bottom surface that seats onto a top surface of the lower body, the bottom surface of the middle section having multiple circular O-ring channels for retaining one or more O-rings configured to press against the top surface of the lower body;
   a nut retained by the lower body and configured to threadably engage the threaded side surface of the upper body to hold the upper body down against the lower body, forming a sealed connection between the upper body and the lower body;
   a first test port including a first channel that extends from an exterior of the upper or lower body into an interior of the upper or lower body between two of the O-ring channels; and
   a second test port including a second channel that extends from the exterior of the upper or lower body into the hole that receives the cable or tube.

10. The containment seal of claim 9 wherein the middle section has a threaded side surface configured to threadably receive the nut.

* * * * *

UNITED STATES PATENT AND TRADEMARK OFFICE
CERTIFICATE OF CORRECTION

PATENT NO. : 10,796,808 B2
APPLICATION NO. : 15/810976
DATED : October 6, 2020
INVENTOR(S) : Derek Noel Page 1 of 1

It is certified that error appears in the above-identified patent and that said Letters Patent is hereby corrected as shown below:

On the Title Page

In Abstract, Line 9, delete "in" and insert -- is --, therefor.

In the Specification

In Column 3, Line 37, delete "heart" and insert -- heat --, therefor.

In Column 5, Line 40, delete "of the of the" and insert -- of the --, therefor.

In Column 7, Line 28, delete "251." and insert -- 252. --, therefor.

Signed and Sealed this
Eighteenth Day of May, 2021

Drew Hirshfeld
*Performing the Functions and Duties of the*
*Under Secretary of Commerce for Intellectual Property and*
*Director of the United States Patent and Trademark Office*